Jan. 17, 1933.  H. CHRETIEN  1,894,265
APPARATUS FOR PRINTING SYNTHETIC ANAMORPHOSED FILMS
Original Filed Sept. 7, 1929   2 Sheets-Sheet 1
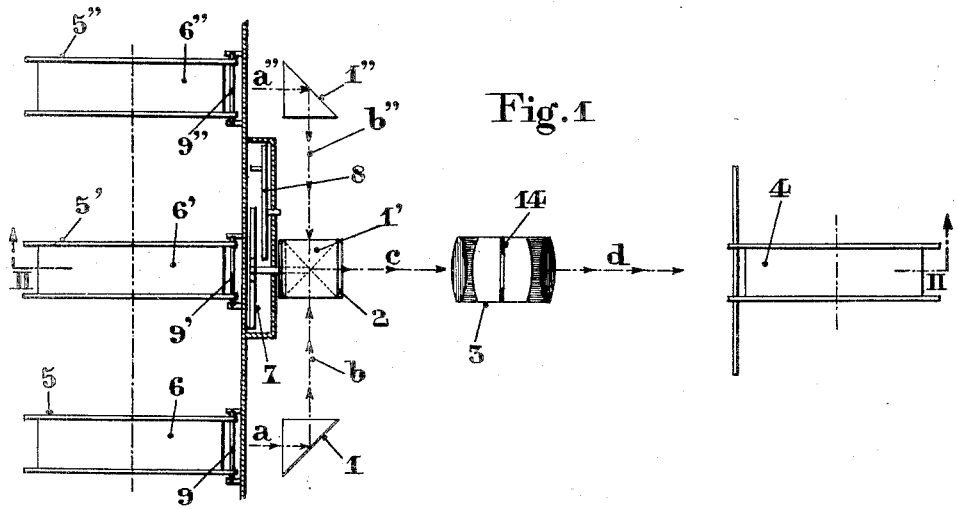
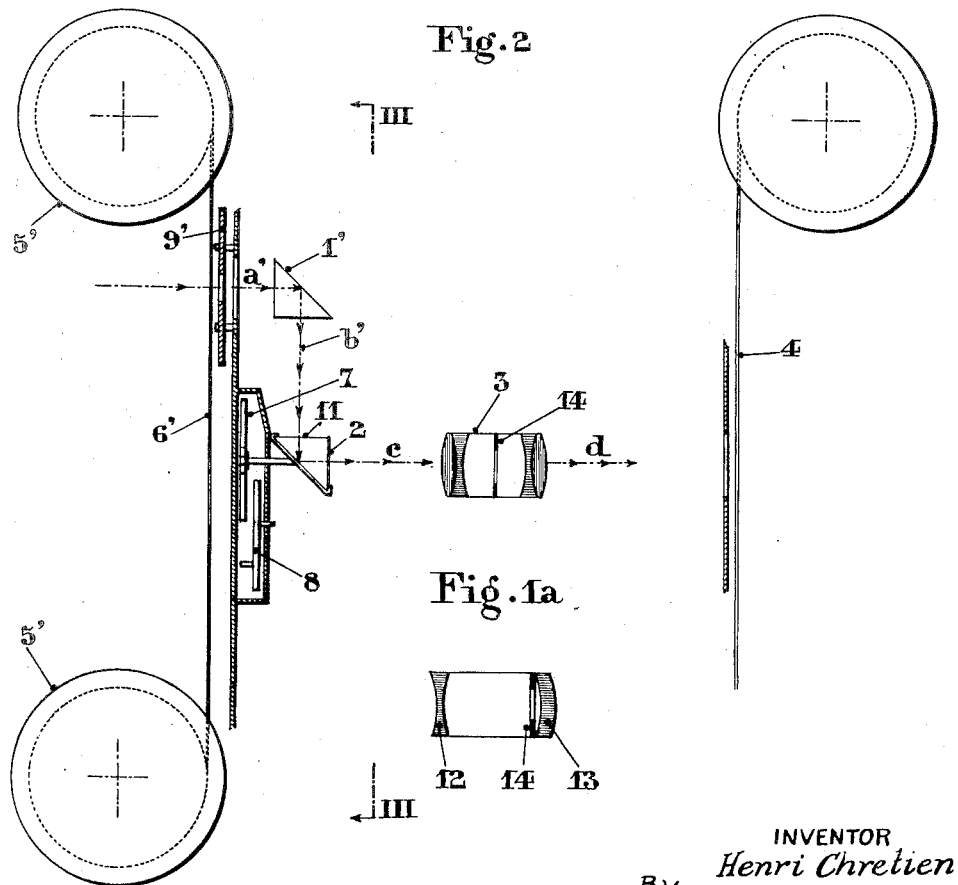
INVENTOR
Henri Chretien
By Tyre, Scott & Keel
ATTORNEYS Jan. 17, 1933.  H. CHRETIEN  1,894,265
APPARATUS FOR PRINTING SYNTHETIC ANAMORPHOSED FILMS
Original Filed Sept. 7, 1929   2 Sheets-Sheet 2

INVENTOR
Henri Chretien
By Eyre, Scott & Keel
ATTORNEYS

Patented Jan. 17, 1933

1,894,265

UNITED STATES PATENT OFFICE

HENRI CHRÉTIEN, OF SAINT-CLOUD, FRANCE

APPARATUS FOR PRINTING SYNTHETIC ANAMORPHOSED FILMS

Original application filed September 7, 1929, Serial No. 390,878, and in France October 6, 1928. Divided and this application filed January 6, 1932. Serial No. 585,133.

The present invention relates to an application of the principle of the anamorphosis for the obtention of synthetic cinematographic views by several juxtaposed views corresponding to a plurality of negatives of different scenes and is particularly adapted to the obtention of such views on a film to be used for cinematographic projection. The idea of producing simultaneously on a screen, from a single film, different scenes is known in the art, which is not surprising in view of the possibilities (evocations, contrasts, etc....) it affords to the stage managers but the methods proposed heretofore showed always a deficiency which prevented their commercial use. According to said methods the different images juxtaposed on the screen covered together the normal area of one single image and for each of the partial views, an entirely inadequate area was reserved.

The present invention removes this objection by making possible the copying at the same time, upon one single positive film, by means of a special apparatus hereinafter described and disclosed in my copending application No. 390,878, of which the present application is a division the views taken from a plurality of different negatives. Said positive film is projected by the machine on the screen after having been submitted to an anamorphosis which annihilates the distortion due to the first anamorphosis. Each of the partial views thus takes on the screen a convenient space and the whole covers a rectangle the ratio of which is not 3×4 as in the projection of standard images; the width (or length) of the image is increased in the same ratio as the anamorphotic power used or the height is increased in case the producer wishes to place the different simultaneous views one above the other instead of alongside one another.

My novel machine utilizes an anamorphosing system adapted to produce images having the necessary qualities for their use in the whole field required in cinematography. This advantage which has a particular importance when taking the views has already been made use of in other optical combinations using the above mentioned anamorphosing system and in other applications of the anamorphis such as the application of U. S. patent application No. 236,300 of Georges Chretien and U. S. Patent No. 182,633 of Henri Chretien. The anamorphosing system proper is disclosed in my copending U. S. patent application No. 395,045.

For a better understanding of the invention reference should be had to the accompanying drawings of which:

Fig. 1 is a plan view of a printing machine embodying the invention;

Fig. 1a is a view of the anamorphoser adapted to be used with the machine of Fig. 1;

Fig. 2 is a sectional view of the machine taken along the line 2—2 of Fig. 1;

Figure 3:
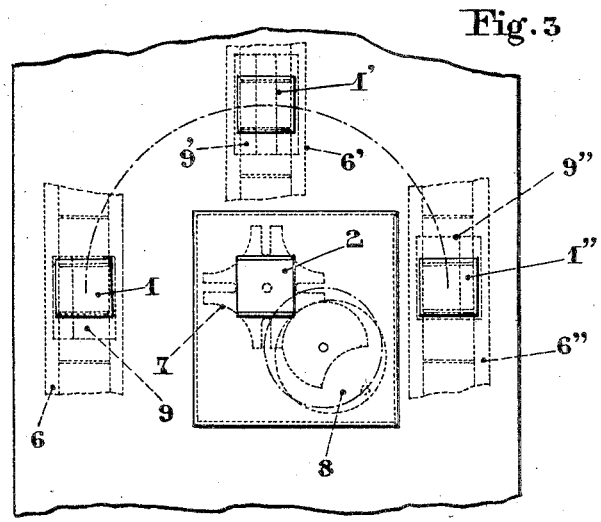
Fig. 3 is a view taken along the line 3—3 of Fig. 2.

The machine illustrated as embodying the invention comprises three stationary prisms 1, 1′ and 1″ arranged around a prism 2 which is adapted to be intermittently rotated to successively direct the light from the stationary prisms to an objective 3 of any suitable type. Between the parts of the objective 3 shown on Figure 1, an anamorphoser shown on Figure 1a is placed. This anamorphoser comprises for example two cylindrical lenses 12 and 13 the generating lines of which are parallel, said lenses being adjusted as disclosed in the above mentioned patent and patent applications. The cylindrical lenses may be located as shown one on one side and the other on the other side of the diaphragm 14. A film 4 upon which the images are to be combined travels in the path of the light from objective 3. Feeding devices 5, 5′ and 5″ carrying the original negatives 6, 6′ and 6″ respectively are associated with the respective prisms 1, 1′ and 1″ and are driven synchronously with the movement of prism 2. Preferably the position of the feeding devices are adjustable to enable any point on the films 6, 6′ or 6″ to be brought into the center of the area of the film 4 which is to be printed from the films 6, 6' and 6" and to enable these points to be focussed on said area.

A suitably driven Geneva driver, shown at 7 and 8, periodically rotates the prism 2 through an angle of 90° to enable it to reflect and transmit the light successively from each film 6, 6' and 6" and associated stationary prism toward film 4. The synchronization of the movement of films 6, 6' and 6" with the rotation of prism 2 may be effected in any well known manner. When the prisms 1, 1' and 1" are arranged concentrically, as shown, the planes of the films 6, 6' and 6" may be made to coincide and the mechanical operation of the devices 5, 5' and 5" thereby simplified.

If the anamorphosis ratio is equal to the number of negative films the views of the negatives are integrally reproduced. If said ratio is lower than the number of negative films, part only of each view is copied on the positive film.

Figure 4:
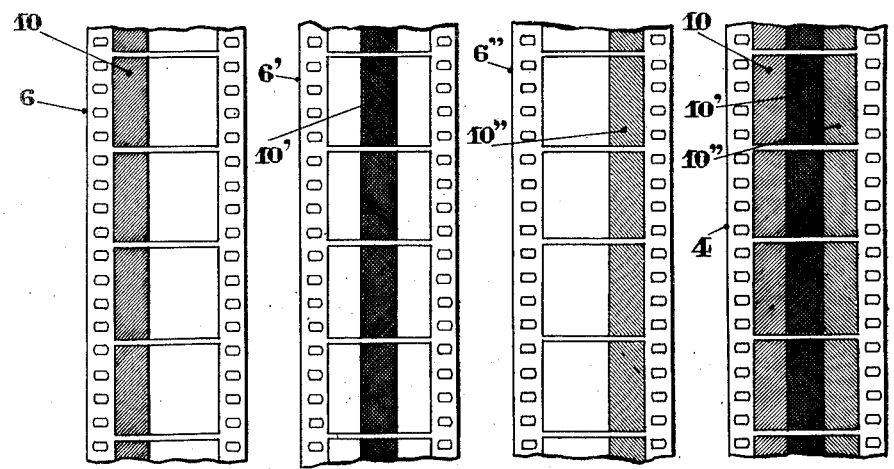
Fig. 4 is a diagrammatic illustration of one method whereby three different images may be distributed on the exposed sensitive coating of the same film.

Figures 3 and 4 show the extreme case when the anamorphosis ratio is 1:1. In case of a higher ratio greater parts of the views of the films 6, 6' and 6" including even the whole views are printed on film 4 the movable screens or masks being cut accordingly.

Removable opaque screens 9, 9' and 9", provided with openings cut in any arbitrary fashion, are placed in the lighting apertures of the images on films 6, 6' and 6" so as to select in each negative the region to be reproduced. If it is desired to reproduce on film 4 such sections of films 6, 6' and 6" as are designated respectively on the said film 4 (see Fig. 4) by 10, 10' and 10" then the opening in the removable screen 9 associated with film 6 is cut in the shape of section 10, the opening in the screen 9' associated with film 6' is cut in the shape of section 10' and similarly the opening in the screen 9" associated with film 6" is cut in the shape of section 10". Surface 10, is printed when face 11 of prism 2 is exposed to the incident light from prism 1; the beam of light following the path $a$, $b$, $c$ and $d$. The Geneva driver then turns prism 2 through 90° to bring face 11 into the path of the incident light from prism 1'; the beam of light now following the path $a'$, $b'$, $c$ and $d$ and causing section 10' to be printed upon film 4. Similarly, upon rotation of prism 2 through 90°, light passing through the exposed portion of film 6" travels in the path $a''$, $b''$, $c$ and $d$ to print section 10" upon the film 4. During the further rotation of prism 2, film 4 is advanced through the distance required to bring an unexposed portion into view; negatives 6, 6' and 6" each being advanced through a distance corresponding to one image either simultaneously with the movement of film 4 or at any time during the periods when prism 2 is in inoperative relation with the associated stationary prism.

Suitable means are of course provided for correlating the lighting to the rotation of prism 2. These means are not illustrated as they are well known in the art. For example, a rotating shutter could be arranged to screen the light except when prism 2 is stationary, or the electric circuit of the light could be arranged for closure only during such periods.

If it is desired to print all of the images from films 6, 6' and 6" on film 4 in order to thereafter project the three pictures in juxtaposition, the anamorphoser illustrated in Fig. 1a is inserted between the parts of the objective 3 of Fig. 1. The use of the anamorphoser permits of the three images one from each of films 6, 6' and 6" being reproduced in compressed form as a single image of standard dimensions on film 4, which image may then be projected onto a screen through another anamorphoser to show the three pictures simultaneously; each being restored to standard dimensions.

When it is desired to use the machine for reproducing on a film of standard dimensions views taken with a wide angle lens on a larger size negative, as disclosed in the above-mentioned United States application S. N. 335,564 the anamorphoser of Fig. 1a is also inserted between the parts of the objective 3 of Fig. 1 and the over size negative film is fed by one or the other of devices 5, 5' or 5"; the other devices being rendered inoperative, as by closure of the removable screens associated therewith. The film 4 will then have printed thereon images of standard dimensions but with laterally or horizontally compressed views, which may be projected through another anamorphoser to give panoramic pictures of granulation of the order of that of the original large size negative.

Instead of reducing the images from a large negative, or from a plurality of negatives, to produce images of standard dimensions on the film 4, the machine may be used with the anamorphoser of Fig. 1a to compress images from a film of standard dimensions to thereby reserve space on film 4 for the acoustic elements of a sound film.

The new machine for printing of synthetic films has now been described in connection with one particular embodiment thereof. Obviously various modifications could be made in the machine without departing from the spirit of the invention.

The number of negative films may thus vary as well as the anamorphosis ratio. When this ratio is lower than the number of negative films, it is not essential that the borders of the regions cut out by the removable screens meet. They may even overlap to superpose several images if desired. Obviously the shape of these sections is immaterial, as is also the number of subjects combined on a single film. In place of the prism 2, an Amici prism, known as a roof shaped prism, may be advantageously employed. This prism, by reproducing on film 4 images that are not inverted, permits of the simplification of the driving mechanism of the films; film 4 being driven in the same direction as are the original negatives, when the images thereon are not inverted. It is possible also to substitute mirrors for any or all of the prisms.

What I claim is:

1. A machine for obtaining synthetic anamorphosed films from a plurality of original films said machine comprising in combination a mask placed behind each of the original films each of said masks covering on each film the part not to be reproduced, a stationary prism placed behind each of said masks, a prism adapted to be intermittently rotated in positions to receive light transmitted through said original films through said masks and through said stationary prism and to transmit said light in one direction and an optical system comprising a spherical objective and cylindrical lenses the generating lines of which are placed in a parallel relation said optical system being adapted to receive the light transmitted by said rotatable prism and to transmit the same onto different unexposed portions of a film.

2. A machine for obtaining synthetic anamorphosed films from a plurality of original films, said machine comprising in combination a stationary prism placed behind each of said films, a prism adapted to be intermittently rotated in positions to receive light transmitted through said original films and through said stationary prisms and to transmit said light in one direction and an optical system comprising a spherical objective and cylindrical lenses the generating lines of which are placed in parallel relation, said optical system being adapted to receive the light transmitted by said rotatable prism and to transmit the same onto different unexposed portions of a film.

In testimony whereof I have signed this specification.

HENRI CHRÉTIEN.